Dec. 13, 1966  L. J. ULINE ETAL  3,291,889
DIELECTRIC INTERRUPTER

Filed Feb. 18, 1966  2 Sheets-Sheet 2

INVENTORS
LAWRENCE J. ULINE
HELIO A. TRULL

BY John R. Maherty
ATTORNEY though the inlet end of the cell 10. A pump 13 continuously circulates liquid amalgam

United States Patent Office 3,291,889
Patented Dec. 13, 1966

3,291,889
DIELECTRIC INTERRUPTER
Lawrence J. Uline, Lakewood, Ohio, and Helio A. Trull, St. Petersburg, Fla., assignors to Union Carbide Corporation, a corporation of New York
Filed Feb. 18, 1966, Ser. No. 538,516
4 Claims. (Cl. 174—8)

This application is a continuation-in-part of my co-pending United States patent application Serial No. 332,504, now abandoned, filed December 23, 1963. This invention relates to a dielectric interrupter; viz. a device for the electrical separation of a conductive liquid flowing through a conduit, pipe, or the like.

In the electrochemical art, there are a variety of electrochemical cells known which employ as one electrode thereof an electrically conductive liquid. This liquid is usually supplied to the electrochemical cell through a circulatory system, the purpose of which generally is to remove by-products formed during the electrochemical reaction or to replenish quantities of the active component of the liquid depleted during the reaction. One example of such a cell is a flowing mercury cathode-chlorine cell. Another example is a primary battery which uses sodium and oxygen as the fuel and oxidant, respectively. In such a battery, the anodic sodium is supplied to each cell as a liquid sodium amalgam from an external circulatory system. The function of the circulatory system is to replenish the liquid amalgam which is depleted during the electrochemical reaction within each cell with additional quantities of sodium.

When electrochemical cells of this character are connected in series, each cell must be electrically isolated from each of the other cells, other than by way of the external series connection, to prevent short circuits. Since a circulating conductive liquid between cells is a source of short circuits, the conductive path of the liquid must be broken to prevent short circuits from occurring in the circulatory system of the liquid which forms an electrode within the cells.

It is therefore an object of the invention to provide a device which is adapted to electrically isolate portions of a liquid flowing through a conduit, pipe, or the like. More specifically, it is another object to provide a device for electrically isolating an electrochemical cell employing as one electrode thereof an electrically conductive liquid, such as a sodium amalgam, supplied from an external circulatory system. Another object is to provide such a device, the construction of which is made partly of metal components for ruggedness, but which is electrically non-conductive and particularly short in length from its inlet to outlet end since such devices are usually used in submarines and other mobile platforms where space requirements are critical. A further object is to provide such a device which is simple, rugged, readily assembled, and easily installed and which can be employed satisfactorily under highly mobile conditions such as experienced in submarines where oscillatory or pitch and roll motions can be very severe.

The invention by means of which these and other objects are attained comprises a dielectric interrupter which is adapted to separate or interrupt electrically the flow of an electrically conductive liquid through a conduit, pipe, or the like by dividing the liquid into at least one stream of discrete droplets which has a dielectric value sufficient to electrically isolate the inlet liquid from the outlet liquid. Broadly, the dielectric interrupter of the invention comprises a vertically disposed hollow body, liquid inlet means at the top and liquid outlet means at the bottom of said body, and means for readily dividing the liquid flowing through said hollow body into at least one stream of discrete droplets which combine again near the outlet end of said body.

For the sake of clarity, the dielectric interrupter will be described in connection with a sodium amalgam-oxygen battery, mentioned briefly hereinabove, but it is to be understood that the invention may apply to other electrochemical cells wherein mercury is continuously circulated through the cell by way of an external system.

The invention will now be more particularly described with reference to the accompanying drawings, in which.

Figure 1:
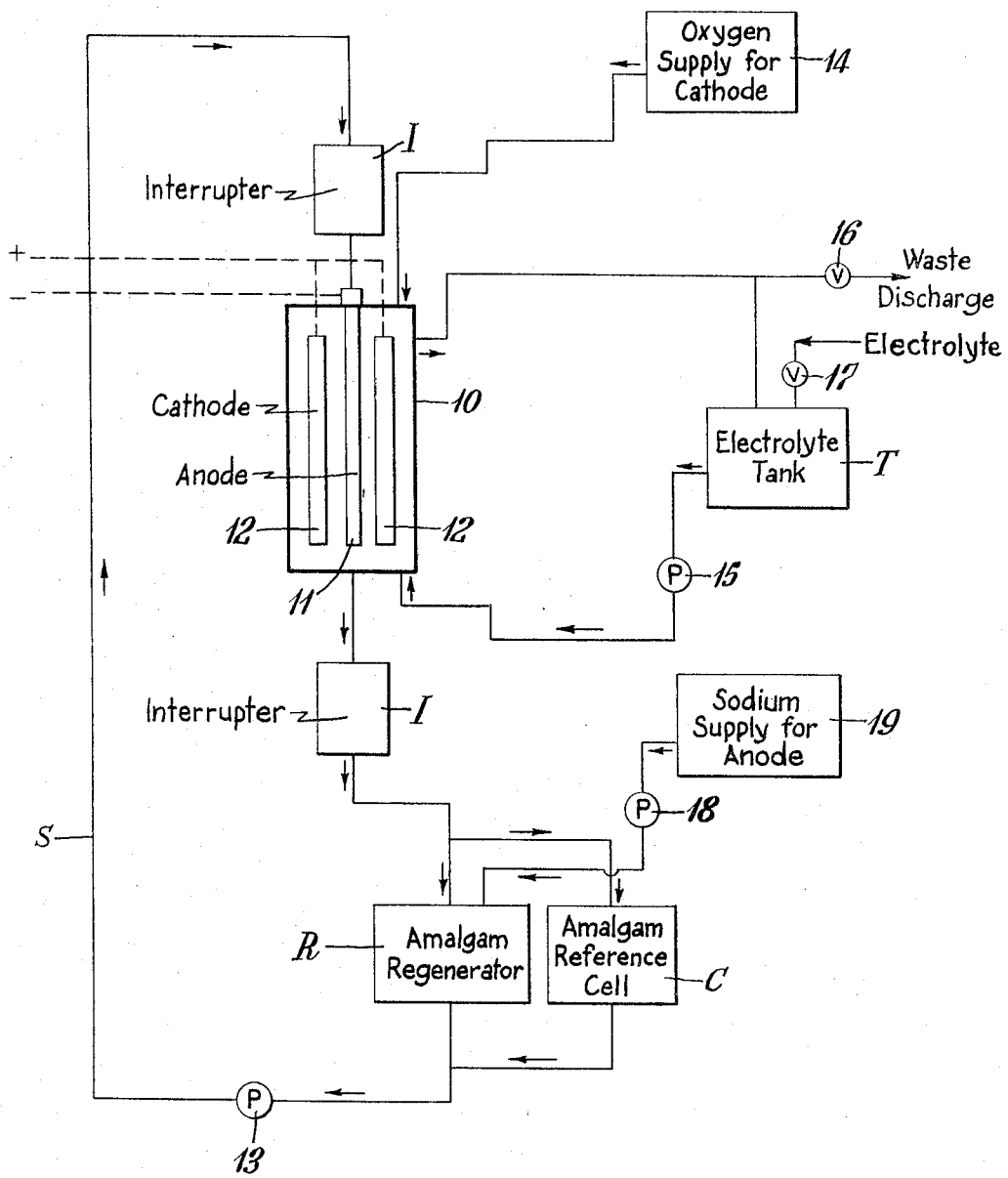
FIG. 1 is a diagrammatical view of a unit cell of a sodium amalgam-oxygen battery which schematically shows a liquid amalgam circulatory system embodying the dielectric interrupter of the invention.

Referring to the drawings, the numeral 10 in FIG. 1 denotes a typical unit cell of a sodium amalgam-oxygen battery which has an anode 11 and a pair of cathodes 12. A liquid amalgam circulatory system, generally denoted by the letter "S," is associated with the cell 10 and includes an amalgam regenerator R, a reference cell C, and a pair of dielectric interrupters I according to the invention, one of which is positioned at the inlet end and the other at the outlet end of the cell 10.

A pump 13 continuously circulates liquid amalgam through the circulatory system S and through the cell 10. Gaseous oxygen is fed to the cathode of the cell 10 from an oxygen supply 14, suitably an oxygen storage tank or oxygen plant. Liquid electrolyte is continuously passed through the cell 10 countercurrently to the flow of liquid amalgam from an electrolyte tank T by a pump 15. Waste electrolyte because of its high concentration of sodium hydroxide is discharged and fresh water to dilute the electrolyte is added, when needed, to the tank T by periodically opening and closing valves 16 and 17, respectively. Liquid sodium is fed to the amalgam regenerator R through a pump 18 from a suitable supply 19 of sodium.

It will be obvious to those in the art that a battery will contain a plurality of cells similar to cell 10, with the cells usually connected in series, and that for convenience and savings in weight and space the amalgam circulatory system S will supply amalgam to each of the cells suitably through a manifold. The dielectric interrupters I of the invention, disposed at both the inlet and outlet ends of the cell 10 and the other cells of the battery, are essential to the operation of this battery system, their function being to electrically isolate the cell 10 and each of the other cells constituting the battery from the circulating flow of liquid amalgam through the circulatory system S and thereby from each other.

Figure 2:
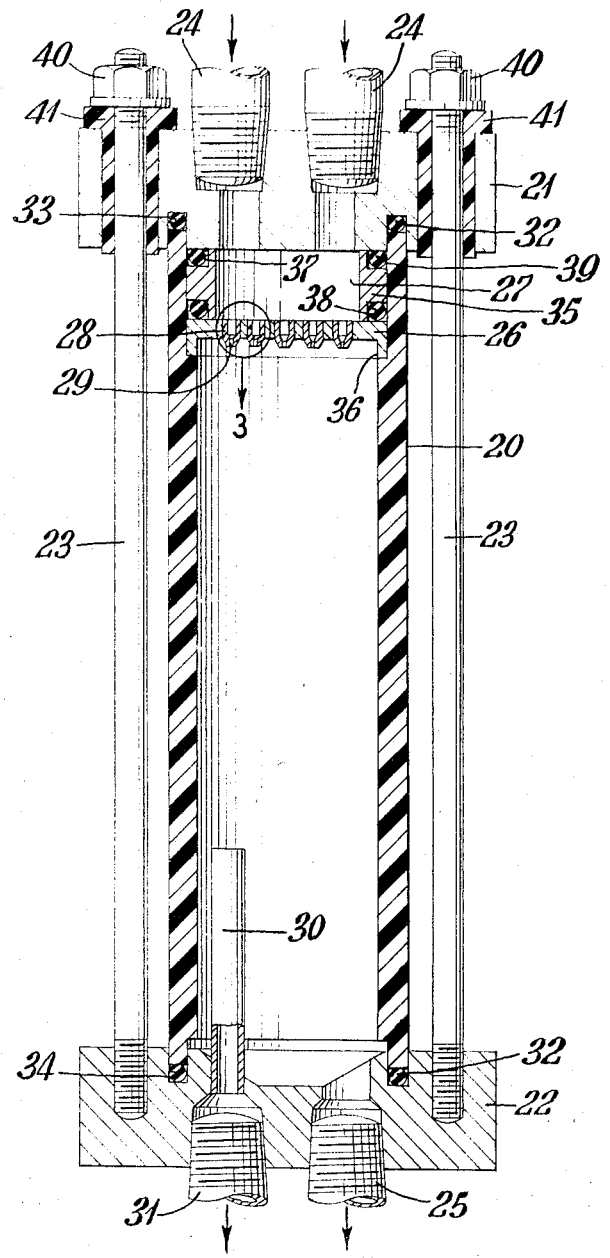
FIG. 2 is a vertical cross-sectional view of the dielectric interrupter of the invention.
Figure 3:
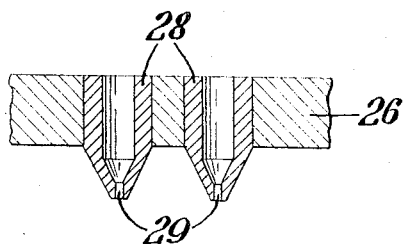
FIG. 3 is an enlarged fragmentary view of two of the preferred nozzles shown in FIG. 2.

A dielectric interrupter I in accordance with the invention is shown in detail in FIGS. 2 and 3 and, as there shown, comprises a hollow vertically disposed body 20, suitably a cylinder as hereinafter referred to, composed of a dielectric material substantially inert to the liquid flowing therethrough. Polymers of methacrylic acid esters are preferred as the dielectric material. An inlet header 21 is mounted at the top of the cylinder 20 and an outlet header 22 is mounted at the bottom, each of which is suitably composed of metal, such as low carbon steels and which together with the cylinder 20 form a compact unit of about 6–8 inches in length. Metal tie rods 23 bolt the cylinder 20 between an inlet header 21 and an outlet header 22. One or more liquid inlet pipes 24 are connected to the inlet header 21, and an outlet pipe 25 is connected to the outlet header 22. For the purpose of clarity, the pipes 24 and 25 can be considered as a part of the network of metal conduits or pipes which constitute the liquid amalgam circulatory system S of the sodium amalgam-oxygen battery depicted in FIG. 1.

Liquid amalgam enters the dielectric interrupter I through the pipe 24 within the inlet header 21, and then passes through a means for separating the flowing liquid into discrete droplets, which as shown in the drawing, is preferably a disc-shaped distributor plate 26 having at least one orifice therein and preferably a plurality of uniformly spaced orifices. The distributor plate 26 is mounted within the top of the cylinder 20 and is spaced from the inlet header 21 so as to define a chamber 27 thereabove in which the liquid amalgam collects as it enters from the pipe 24. Supported within the orifices of the distributor plate 26 are a plurality of nozzles 28 having a straight tubular section disposed within the wall portion of the distributor plate 26 and an extending portion characterized by a pronounced taper. The plate 26 and nozzles 28 can be made of any material substantially inert to the flowing liquid, and when the liquid is amalgam, the material is preferably a low carbon steel. The design of the nozzle 28 is critical in that the tapered tip must extend below the distributor plate 26.

Each nozzle 28 is provided with an orifice 29, preferably in the order of about .016 to .020 inch in diameter, and a tapered tip, the latter of which breaks and separates the flowing liquid passing through the orifice 29 into discrete drops almost immediately below the nozzle tip (about .5 to 1 inch); where orifices alone (or flat shaped nozzles of even of the same diameter orifice as taught herein) in the distributor plate cause the liquid stream to break and separate into discrete drops at distances greatly in excess of .75 inch and also generally contribute to poor interrupter performance, particularly when under severe roll and pitch, etc. movements. The interrupter of the invention can be titled as much as 30 degrees from vertical and still operate effectively. Thus, orifices alone or flat shaped nozzles invariably cause the interrupter to be in excess of 20 inches in length from inlet to outlet in contrast to the nozzle of the invention which greatly reduced the length of the interrupter unit to less than half of said distance or about 6–8 inches. As shown in FIG. 3, the orifice 29 of the nozzles 28 are provided at the tapered end of the nozzle. This construction prevents the flowing liquid from collecting on the underside of the plate as drops so large that when they fall the dielectric value across the device is destroyed. The shape of the nozzles 28, is critical and the amount of taper is a function of and dependent on the viscosity of the flowing liquid, its ability to wet the distributor plate, and the flow rates involved. With a flowing amalgam, the use of nozzles having a tapered tip rather than orifices alone or flat tipped nozzles is definitely preferred since the interrupter can be shorter and because the amalgam stream is broken and separated into discrete droplets almost immediately upon passing through orifice 29, i.e. in the order of about one inch.

The droplets formed by the action of the plate 26 and the nozzles 28 pass under the influence of gravity through the intermediate portion of the hollow body, and then fall to the bottom of the cylinder 20 where they collect in a liquid pool. The liquid amalgam is then carried off through the outlet pipe 25 within the outlet header 22. It will be understood that the droplets of liquid amalgam as they pass through the cylinder 20 are spaced from each other, the spacing between the droplets, although small, being sufficient to impart to the plurality of streams of discrete droplets a dielectric value which is high enough to prohibit a significant flow of electric current through the droplet streams. As used herein, the term "dielectric value" means the measure of voltage potential required to pass a given electrical current through a medium, in this instance the plurality of streams of discrete droplets.

A ventilator-overflow means 30 is preferably mounted in the interrupter to prevent collection of the flowing liquid within the interrupter to such an extent that the collected liquid reaches the body of incoming liquid, thereby rendering the interrupter subject to short circuits, and to vent gases which may otherwise collect in the interrupter. As shown in FIG. 2, the ventilator-overflow means 30 comprises a tubular member extending upwards from the outlet header 22 to a height no higher than that which would significantly decrease the dielectric value of the interrupter. Thus, although the flow of liquid amalgam entering the dielectric interrupter I through the inlet pipe 24 may fluctuate from time to time so that excessive quantities of amalgam could possibly collect in the liquid pool, the possibility of short circuits by fluctuations in the height of the liquid in the device is avoided, since excess liquid amalgam overflows through the overflow means 30 and is carried off by the pipe 31 in the outlet header 22. It will be apparent that the overflow means 30 is not an essential part of the interrupter of the invention in some instances, especially when the hollow body 20 is made extremely long, the liquid flow is constant, or no gases need to be vented to or from the interrupter, but for applications in which a device of small dimensions is required, flow rates vary, or gases are required to be vented, the overflow ventilator means 30 is an important part of the interrupter.

The hollow cylinder 20 is liquid-tightly sealed between the inlet and outlet headers 21 and 22 by "O" rings 32 of a suitable gasket material, such as natural or synthetic rubbers, which are positioned within annular recesses 33 and 34 provided respectively in the inlet header 21 and outlet header 22. Because a liquid amalgam of mercury, for example, a sodium amalgam, is toxic and should be handled with caution to prevent danger, adequate sealing of the dielectric interrupter I is important.

An annular spacer ring 35 of a suitable material such as low carbon steel, tightly engages the distributor plate 26 against an annular recessed shoulder 36 on the wall of the cylinder 20 which supports the plate 26. The spacer ring 35 has an annular "L"-shaped recess 37 at its top peripheral edge and a similar recess 38 at its bottom edge within each of which is provided an "O" ring 39, suitably made of rubber. The "O" rings 39 seal the chamber 27 against leakage of liquid amalgam through the peripheral edge of the disc-shaped distributor plate 26 and prevent short-circuiting of the device by the passage of a continuous film of liquid down the walls of the cylinder 20.

Tie rods 23, as before mentioned, secure the inlet header 21 at the top and the outlet header 22 at the bottom of the cylinder 20. One end of the tie rods 23 are connected to the outlet header 22, the other end passing through holes in the inlet header 21 to take-up nuts 40. A flanged bushing 41 composed of a dielectric material, such as nylon, is provided within each of the holes in the inlet header 21 through which the tie rods 32 pass and electrically insulates the tie rods 23 from the inlet header 21. It will be evident that the provision of the flanged bushing 41 along with a hollow body 20 of dielectric material renders the interrupter of the invention electrically nonconductive between the inlet means 24 and outlet means 25. Of course, it is well within the scope of the invention to provide other means for electrically insulating the interrupter between its ends, such as, for instance, by providing the tie rods 32 with sleeves of an insulating material, or by making the entire interrupter of a nonconductive material having suitable mechanical strength.

It will thus be apparent that the invention provides a compact device small in length and which electrically separates a conductive liquid, such as a liquid amalgam, flowing through a network of conduits, pipes, or the like almost immediately upon passing through the orifices of the nozzles. The invention also provides a rugged, sealed construction which may be quickly assembled and disassembled for the purpose of maintenance.

Several dielectric interrupters were constructed as described above. One dielectric interrupter was installed at the inlet end of each cell in a sodium amalgam-oxygen battery and another at the outlet end of each cell within a circulatory system which continuously circulated liquid amalgam through each cell of the battery. The dielectric interrupters proved wholly successful in electrically isolating each cell from the liquid amalgam circulating through the system, from the other cells, and from the network of metal conduits or pipes which carried the liquid amalgam through the system. Dielectric interrupters constructed in accordance with the invention have been successfully operated at potentials up to 560 volts D.C.

What is claimed is:

1. A compact dielectric interrupter for electrically interrupting the continuity of a flowing liquid amalgam stream comprising, in combination, a vertically disposed hollow body composed of a dielectric material, an inlet header at the top and an outlet header at the bottom of said body, each of which header is composed of metal, metallic tie-rods means holding said headers in place with said hollow body therebetween, insulating means electrically insulating said tie-rod means from at least one of said headers, a perforated distributor plate mounted within the top of said body and spaced from said inlet header so as to define a chamber thereabove, tubular venting and overflow means mounted in said outlet header within the bottom of said hollow body, and means for dividing and breaking said liquid amalgam stream almost immediately as it passes through said perforated distributor plate of said hollow body into a plurality of streams of discrete droplets, said means comprising a plurality of nozzles supported within the perforations of said distributor plate, each of said nozzles having a straight tubular section within the wall portion of said distributor plate and an extending tip portion jutting below said distributor plate characterized by a pronounced taper and conical-like configuration which taper together with the orfice in each of said nozzles greatly facilitates dividing and breaking said liquid amalgam stream into discrete droplets almost immediately below the tips of said nozzles as said stream passes through said orifices.

2. The compact dielectric interrupter of claim 1 wherein the orifices of said nozzles have a diameter of from about .016 inch to about .020 inch.

3. The compact dielectric interrupter of claim 2 wherein said nozzles cause said liquid amalgam stream to divide and break up into discrete droplets within about .5 to about 1 inch from the tapered tip portions of said nozzles.

4. The compact dielectric interrupter of claim 3 wherein the total length of said hollow body and said inlet and outlet headers is about 8 inches.

References Cited by the Examiner
UNITED STATES PATENTS
No references cited.

LEWIS H. MYERS, *Primary Examiner.*